United States Patent [19]

Wynn

[11] 3,866,325
[45] Feb. 18, 1975

[54] CLOTH MEASURING DEVICE

[76] Inventor: Lawrence V. Wynn, 1900 N.W. 95th, Seattle, Wash. 98107

[22] Filed: Nov. 9, 1972

[21] Appl. No.: 305,158

[52] U.S. Cl. .................................. 33/129, 242/68.4
[51] Int. Cl. ............................................. G01b 5/04
[58] Field of Search ............ 33/129, 127, 128, 133, 33/132; 242/61, 62, 68.4

[56] References Cited
UNITED STATES PATENTS

| | | | |
|---|---|---|---|
| 866,957 | 9/1907 | Parsons | 33/129 |
| 1,390,957 | 9/1921 | Hosch | 242/61 |
| 2,771,251 | 11/1956 | Silverstein | 242/68.4 |
| 3,186,443 | 6/1965 | Budzyna | 242/75.2 |

Primary Examiner—Samuel B. Rothberg
Assistant Examiner—Willis Little

[57] ABSTRACT

Portable cloth measuring device having means for rapidly taking material off tubes, boards and the like through a cloth meter onto a cylinder or other unwind member. The device has adjustable tension features as cloth is taken off a bolt or tube and wound on the cylinder. As soon as the material is measured it can be rewound very rapidly and tightly.

18 Claims, 10 Drawing Figures

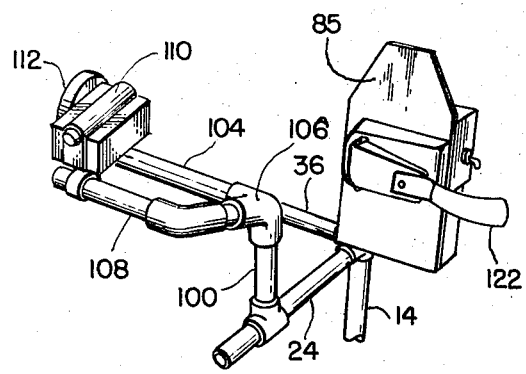
FIG-7
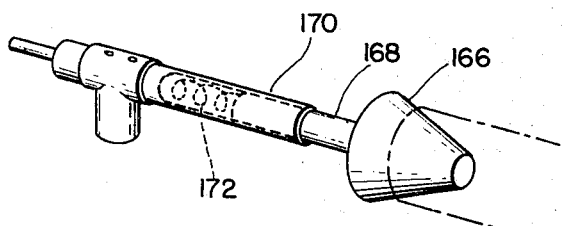
FIG-8
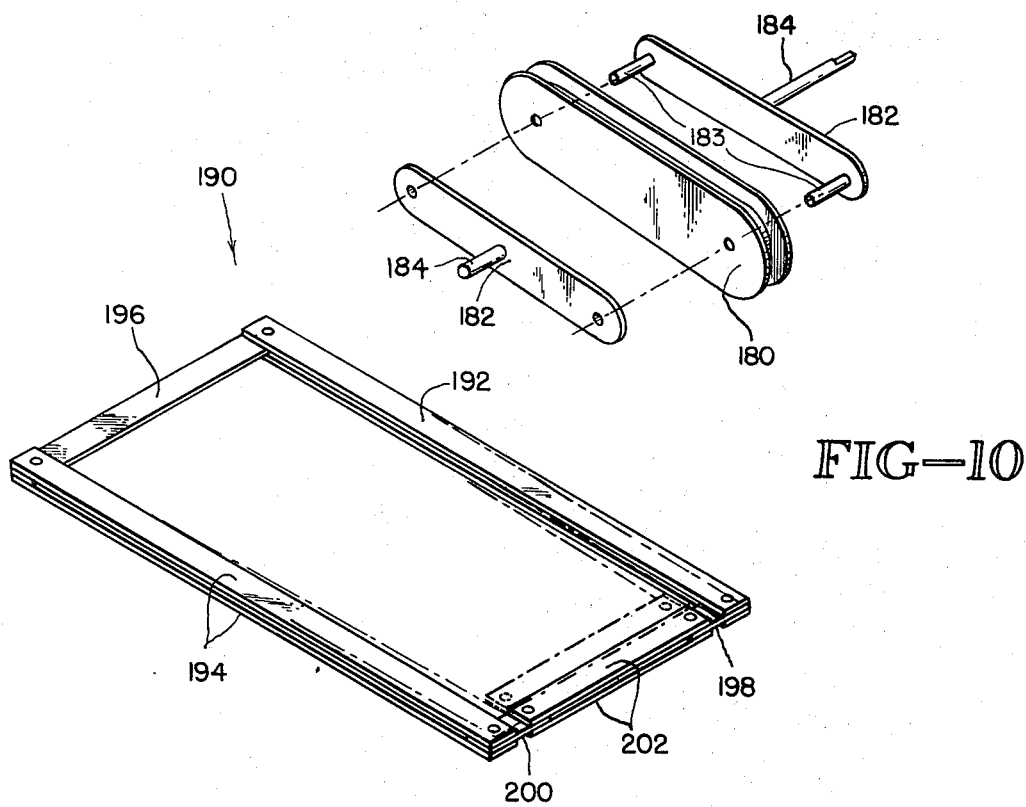
FIG-9
FIG-10

CLOTH MEASURING DEVICE

BACKGROUND OF INVENTION

The invention relates generally to the area of cloth material handling and more specifically to a portable unwinding and rewinding device for accurate measurement of cloth materials.

Those skilled in the art, namely operators of fabric shops and departments, need to know their inventory stock accurately. In many instances the amount of cloth on a bolt or tube is only estimated, since inventorying the complete stock of a store or shop is a long and tedious job. Estimating the amount of material on a tube or bolt is usually done by weighing or counting the number of folds on the holder. Some shops lay out the goods and run them through a meter by hand but this is very time consuming and thus costly. Thus, the most feasible approach for the operator is to guess or estimate even though it is inaccurate. Another area of concern is checking the amount of cloth on a tube or bolt when it arrives from the manufacturer. Frequently the bolts or tubes of material received from the manufacturer can be up to a yard or more short. Over a period of time and particularly if a shop or store has a large volume business, the amount of loss through the shipment shortages can amount to a substantial amount of money. Thus there has been needed a device which will permit rapid handling, accurate metering and allow the incoming shipments to be checked for flaws and shortages.

Among the prior art references considered but not deemed pertinent to this invention are U.S. Pat. Nos. 1,390,957; 1,866,471; 1,959,846; 2,716,006; and 2,771,251.

SUMMARY OF INVENTION

The device comprises a portable lightweight supporting frame on which the working parts are mounted. The material moves off a holder on one side of the frame through a meter and onto a wind-up cylinder on the other side of the frame. Each side may be provided with several types of cloth holder mountings each as clamps for bolts, tube holders, a cylinder or other means on which material can be wound. The material holder is quickly mounted on the unroll side, so that the cloth can be pulled through the meter and threaded onto a cylinder. After metering it is rewound onto the bolt or tube or other holder at a high rate of speed and under sufficient tension to get the material compactly wound on the holder.

Accordingly, it is among the many features, advantages and objects of this invention to provide a cloth measuring device which is light, portable, inexpensive, and uniquely simple. The device is designed so that it can be provided with casters and rolled through the isles of a store or shop. The device unwinds and measures loose-fold materials, tubed materials, boarded materials, from tube-to-tube if desired, from board-to-board if desired, from tube-to-board, and can also be provided with a double and roll attachment. Bolts and tubes can be run through the meter quickly in a manner which is similar to hand metering and then rewound under sufficient tension so that the material is rerolled on its holder very compactly. The machine is easily dismantled with a single wrench for easy shipment and/or reassembly. The machine is ready for use by a single plug-in connection. The device will rapidly and accurately measure trims, bolts, tubes and ribbons. Incoming shipments of materials can be checked for their correct yardage and at the same time the incoming fabric can be checked for flaws. Because of ease and speed in handling, coding and pricing of the fabric also can be done as the fabric arrives.

BRIEF DESCRIPTION OF DRAWINGS

FIG. 7 shows additional details of the meter mounting;

FIG. 8 shows a mounting that may be used for the end of a tube holder;

FIG. 9 shows a mounting for a ribbon holder; and

FIG. 10 shows a collapsible frame that may be used with the clamps shown in FIGS. 1, 5 and 6 on which cut yardage may be wound and easily slipped off.

DESCRIPTION OF PREFERRED EMBODIMENT

Figure 1:
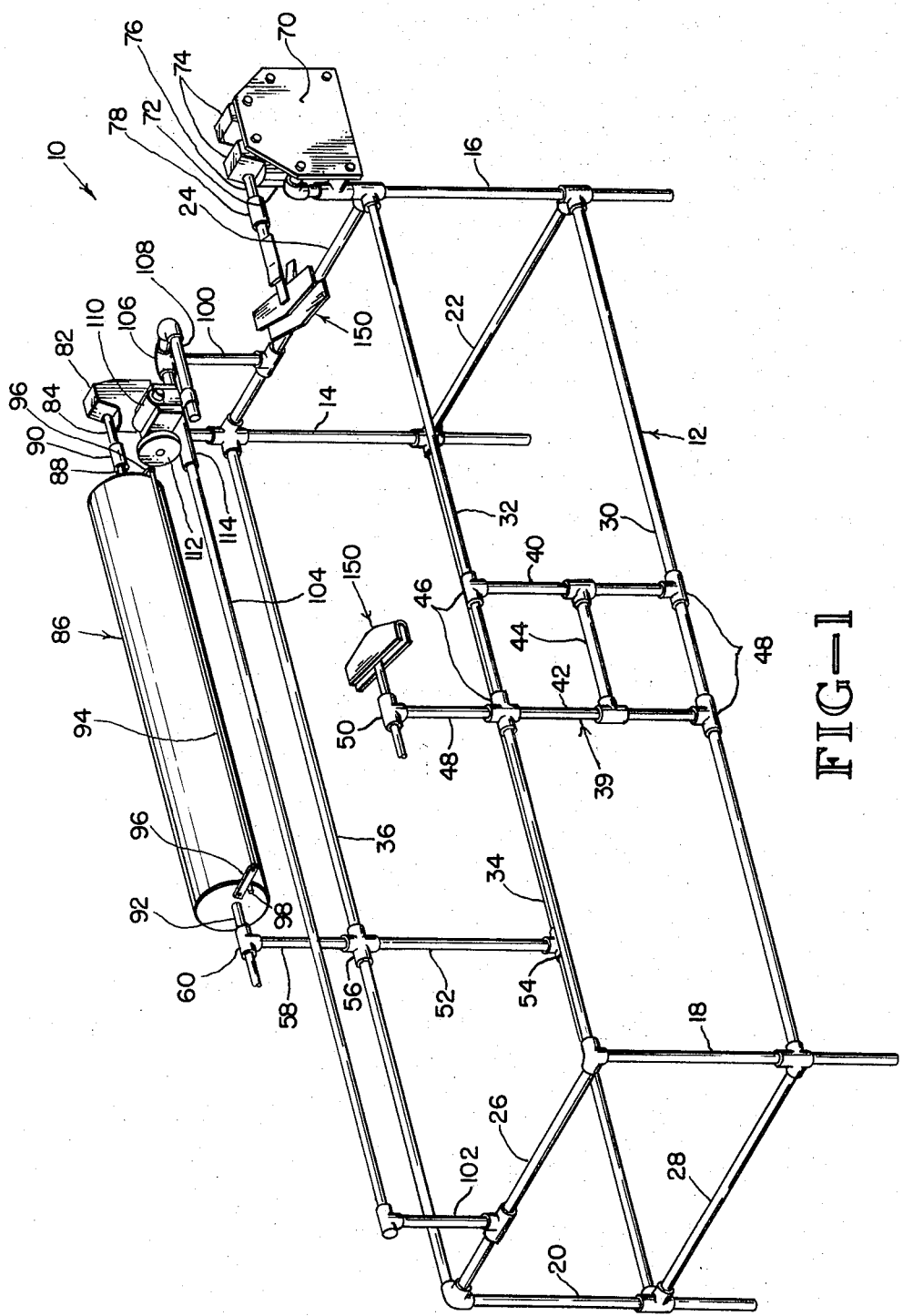
FIG. 1 is a perspective view of the machine showing the general arrangement of parts.

Referring now to FIG. 1 as will be seen that the device, generally designated by the number 10, has a main frame structure generally indicated by the number 12. The frame includes legs 14, 16, 18 and 20. Interconnecting legs 14 and 16 is lower horizontal member 22 and upper horizontal member 24. Interconnecting legs 18 and 20 is upper frame member 26 and lower frame member 28. Interconnecting legs 16 and 18 is lower frame member 30 and upper frame member 32. Interconnecting legs 14 and 20 is lower frame member 34 and upper frame member 36. The frame may be made to telescope to a shorter length if desired. An adjustable or sliding clamp support frame 39 is provided on the unwind side of the overall frame. It comprises vertical members 40 and 42 interconnected by horizontal member 44. At each end of the vertical members 40 and 42 are brackets 46 which are slidably received on upper frame member 32 and lower bracket numbers 48 which are slidably received on lower member 30. Clamping means will be provided with the sliding support frame 39 to clamp it to the main frame so that once in position it will not slide. Extending upwardly from the holder frame 39 is vertical member 49 having at the upper end thereof the T-support 50 for receiving the shafts of the various holders which will be used with the machine. Likewise on the other side of the main frame 12 is a vertical, sliding support member 52 having sliding mountings 54 and 56 at its ends. The sliding frame can also be clamped to the main frame so that once it is in position it will not move as the machine is being operated. A vertical frame piece 58 has on the upper end thereof a support 60 which received a shaft for the holder such as the cylinder shown or other holder means which may be used.

Figure 2:
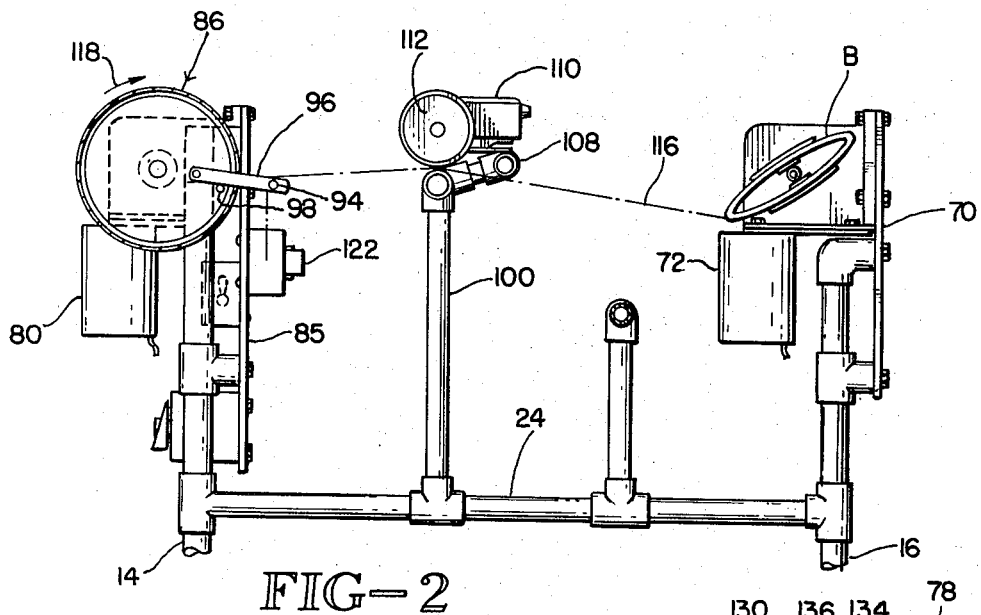
FIG. 2 is a partial, end elevational view of the machine showing additional details of construction and location of components.

At the operator's end of the machine above leg 16 is mounting frame structure including a mounting plate 70. On one side of the plate are a pair of motors 72 with gear reducer attachments 74 connected to a common drive shaft 76. At the outer end of the shaft 76 is a coupling 78 to which a particular holder mechanism may be quickly attached or detached. Coaxially aligned with shaft 76 is the holder mounting means 50 on the sliding frame 39 as previously described. On the other side of the main frame reference being had to FIGS. 1, 2 and 7, is mounting structure above leg 14 including a motor 80 with gear reducer 82. Extending from the gear reducer 82 is a drive shaft 84. Also on the mounting structure above leg 14 is a plate 86 which is not shown in FIG. 1 so that the principal components and principles of operation may be better described. Motor 80 and reducer 82 are supported on structure secured to said plate 86. Coaxially aligned with drive shaft 84 is holder mounting means 60 as previously described.

Detachably mounted for rotation by shaft 84 is a cylinder generally designated by the number 86. Cylinder 86 is a lightweight metal tube having shaft 88 engaged with coupling 90 at one end and a shaft 92 supported in mounting 60 at the other end thereof. A retainer bar 94, over which material is threaded, is pivotally connected to the closed ends of the cylinder by arms 96 which are pivotally mounted on the end walls of cylinder 86. As can be seen in FIGS. 1 and 2 a detent 98 is located at one end wall of the cylinder to hold cloth retaining bar 94 in the position shown. Operation of threading bar 94 will be described more fully hereinafter.

Between the two sides of the device is an upstanding meter support bar 100 mounted on upper cross frame member 24. At the other end of the main frame is an upstanding member 102 having a connector support for cloth guide bar 104 the other end of which bar is mounted at the upper end of vertical member 100 in connector 106. It can be seen, particularly by reference to FIG. 7 that a T-shaped support neck 108 supports a meter 110 having cloth measuring wheel 112. Wheel 112 engages a rotatable sleeve 114 mounted on guide rod 104 preferrably inset so that its surface is flush with bar 104. The meter is mounted so that it swivels on neck 108. It will be appreciated, particularly with reference to FIG. 2, that material on bolt board B will be threaded along the dash dot line 116, between wheel 112 and sleeve 114 and over the cloth retainer bar 94 on the cylinder. As the cloth is fed by starting the machine, cylinder 86 will rotate in the direction shown by arrow 118. Retainer bar 94 cannot drop because of detent 98 and the direction of rotation of cylinder 86 will result in the pivot of arms 96 so that retainer bar 94 lays back on the surface of the cylinder to hold the cloth against the cylinder.

It is to be appreciated that motors 72 positively turn shaft 76 in both directions. Likewise motor 80 for cylinder 86 also turns positively in both directions. The speeds of motors 72 and motor 80 are adjusted to each other so that no tension is placed upon the material as it is being fed for measurement through the meter. Thus, if stretchable cloth such as a knit material is being measured there is no tension on the knit so that measurement of the knit material is accurate. When all of the material has been fed off bolt B onto cylinder 86 the machine is then switched to its re-roll direction. The two motors 72 on the bolt side not only give speed but pull the cloth tightly against the positive re-roll rotation of motor 80 so that it is compactly re-wound onto the bolt board. Controls mounted on plate 85 include a tension adjustment, on-off switch, directional switch for rolling and re-rolling, and a speed control. The speed control is regulated by handle 122. Handle 122 being somewhat elongated permits the operator to move a hip against the handle and by varying the pressure on the handle 122 regulate the speed at which the machine will operate in either direction. It will be appreciated that once relative speeds are set in the motors regardless of direction, the desired looseness or tightness of tension is maintained. Again, in the measuring direction, going from the board to the cylinder for example, the cloth is pulled through the meter is such a way as to simulate hand feeding through the meter for accurate measurement. The relative rotational speeds of the two sides of the machine can be adjusted so that the cloth would actually run loose through the meter. However, it is desired to have considerable tension in the re-roll direction when the material is being put back on the bolt or tube or other holder.

Figure 3:
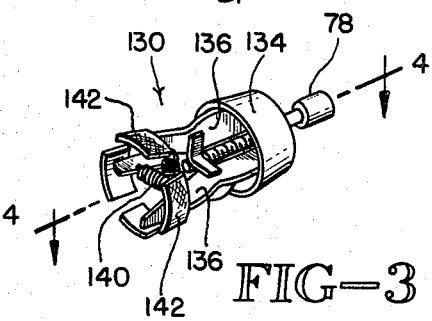
FIGS. 3 and 4 show a detachable tube mounting means for holding tubes on the machine.
Figure 4:
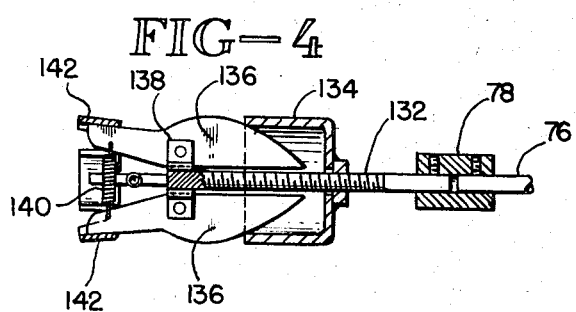

FIGS. 3 and 4 show one means of mounting tubes of cloth on the machine for paying the cloth off to a member such as cylinder 86 or other holder. The tube mount generally designated by the number 130 includes a threaded shaft 132 on which is threadably received cup member 134. Cup member 134 engages four jaw members 136 which are pivotally mounted on studs 138 secured to one end of the shaft 132. The outer ends of the jaw members are pulled together in opposed pairs by tension springs 140. Each of four jaws has on the outer end thereof an arcuate pad 142 for engaging the inside of the tube. If cup 134 is threaded towards coupling 78 the tension springs 140 will bring the jaws together. Likewise if the cup is threaded or turned towards the jaws the outer ends of the jaws will be separated and the pads 142 will be brought into contact with the inside of the tube.

Figure 5:
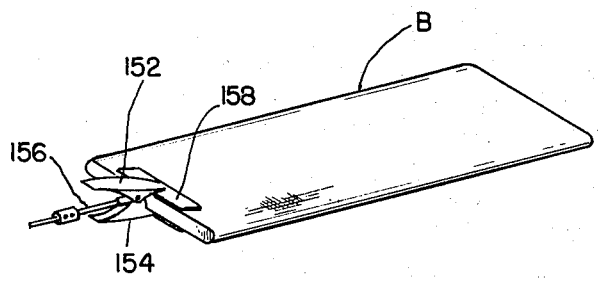
FIGS. 5 and 6 show a clamping means for holding bolts as also shown in FIG. 1.
Figure 6:
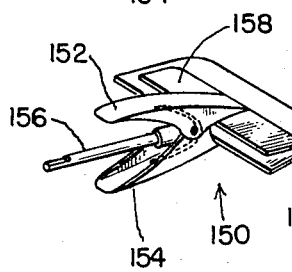

FIGS. 5 and 6 show clamps 150 for holding bolt boards B. The clamps have spring loaded jaws 152 and 154 mounted on shaft 156. Jaw 152 has clamping surface 158 connected thereto and jaw 154 has clamping plate 160 attached thereto. Notice that one plate is somewhat larger than the other in the preferred embodiment. Locking means (not shown) may be used to hold the jaws open until the bolt is in position. The locking means is released and the clamping jaws then snap onto the bolt.

FIG. 8 shows an alternative form of tube mounting for one end of a tube only. In this case a cone 166 will be mounted on a shaft 168 which in turn will be received within a tubular member 170. The shaft 168 is telescopically received into 170 against a compression spring 172 which will tend to force cone 166 outwardly and into the end of a tube shown in dash dot lines.

FIG. 9 is a simple holder for mounting trim or ribbon or the like on the machine. It includes ribbon or trim holder 180 and side mounting bars 182 secured to a mounting shaft 184. Bars 182 are connected to each other by studs 183 which receive wing nuts (not shown). Thus this holder will accommodate trim or ribbon of various widths.

FIG. 10 shows a cut or short yardage attachment which can be used with clamps 150. It comprises a collapsible frame generally designated by the number 190 having longitudinal members 192 and 194 pivotally connected to both ends of cross member 196. Note that the longitudinal members 192 and 194 are in pairs. Two short double pivot members 198 and 200 are each at the outer end pivotally mounted to a pair of longitudinals. On their inner ends they are pivotally mounted to a pair of cross members 202, When the short length yardage has been rolled onto the attachment 190 the members 202 may be pushed inwardly into the position shown in dash dot lines to pull the longitudinal pair members 192 and 194 toward each other on one end. Thus the short length of yardage is easily slipped off the frame. It will be appreciated that the short length attachment 190 can be mounted in holders such as clamps 150 and put on the machine in place of cylinder 86.

What is claimed is:

1. Cloth measuring device comprising:
   a. a support frame,
   b. a first pair of coaxially aligned, spaced apart mounting means supported on said frame for receiving a holder including first drive means for bi-directionally and singularly rotating one of said first pair of mounting means independently from the other of said first pair, said other of said first pair of mounting means being coaxially movable on said frame with respect to said one mounting means,
   c. a second pair of coaxially aligned, spaced apart mounting means supported on said frame for receiving a member on which cloth is wound from the holder on said first pair of mounting means including, second drive means for bi-directionally and singularly rotating one of said second pair of mounting means independently from the other of said second pair, said second pair of mounting means and member being generally parallel to and spaced from said first pair of mounting means and holder,
   d. cloth measuring means disposed between said pair of mounting means and said member, and
   e. control means for adjusting the speed at which said first and second drive means respectively rotate said one of said first and second pairs of mounting means so that when cloth is being unwound from a holder supported by said pair of mounting means to said member there is essentially no tension to distort the cloth and cause the cloth measuring means to be inaccurate, and when said cloth is rewound from said member back to said holder a predetermined tension is applied to the cloth to obtain a tight, compact rewind of the cloth on said holder.

2. The cloth measuring device according to claim 1 and wherein said member is an elongated cylinder.

3. The cloth measuring device according to claim 2 and in which said cylinder is provided with a cloth retainer bar long substantially its entire length for holding cloth to be wound on said cylinder against the surface of said cylinder.

4. The cloth measuring device according to claim 3 and in which said retainer bar is pivotally mounted for limited movement on the cylinder by arm means at each end thereof.

5. The cloth measuring device according to claim 4 and wherein means is provided on said cylinder for holding said retainer bar outwardly from the cylinder surface while cloth is being threaded thereon.

6. The cloth measuring device according to claim 1 and wherein a cloth guide rod is provided in conjunction with said cloth measuring means and which is generally parallel to the axes of said pair of mounting means and to said member.

7. The cloth measuring device according to claim 6 and wherein said cloth measuring means include a meter and a cloth engaging meter wheel.

8. The cloth measuring device according to claim 7 and wherein said guide rod includes a short freely rotatable sleeve which is engaged by said meter wheel and between which wheel and sleeve cloth is passed for measurement thereof.

9. The cloth measuring device according to claim 1 and wherein said first drive means rotates its mounting means and said second drive means rotates said member positively in both directions of rotation and including control means for adjusting their speed of rotation relative to each other.

10. Cloth measuring device, comprising:
   a. a supporting frame including legs, said frame being generally rectangular and made of lightweight metal tubing for easy portability,
   b. a first pair of coaxially aligned spaced apart mounting means supported on said frame for receiving a holder therebetween, including a first drive means for positive, bi-directional and singularly rotation one of said first pair of mounting means independently from the other of said first pair, said other of said first pair of pair of mounting means being secured to a slide frame movable on said slide frame with respect to said one of said pair of mounting means,
   c. a second pair of coaxially aligned, spaced apart mounting means supported on said frame for receiving a member on which cloth is wound from the holder on said first pair of mounting means, including second drive means for bi-directionally and singularly rotating one of said second pair of mounting means independently from the other of said second pair, said second pair and member being generally parallel to and spaced from said first pair of mounting means and holder,
   d. cloth measuring means disposed between said pair of mounting means and said member and positioned to engage the edge portion of cloth being measured on said device, and
   e. control means for adjusting the speed at which said first and second drive means respectively rotate said one of said first and second pairs of mounting means so that when cloth is being unwound from a holder supported by said pair of mounting means to said member there is essentially no tension to distort the cloth to cause the cloth measuring means to be inaccurate, and when said cloth is rewound from said member back to said holder a predetermined tension is applied to the cloth to obtain a tight, compact rewind of the cloth on said holder.

11. The cloth measuring device according to claim 10 and wherein said member is an elongated cylinder.

12. The cloth measuring device according to claim 11 and in which said cylinder is provided with a cloth retainer bar along substantially its entire length for holding cloth to be wound on said cylinder against the surface of said cylinder.

13. The cloth measuring device according to claim 12 and in which said retainer bar is pivotally mounted for limited movement on the cylinder by arm means at each end thereof.

14. The cloth measuring device according to claim 13 and wherein means is provided on said cylinder for holding said retainer bar outwardly from the cylinder surface while cloth is being threaded thereon.

15. The cloth measuring device according to claim 10 and wherein a cloth guide rod is provided in conjunction with said cloth measuring means and which is generally parallel to the axes of said pair of mounting means and to said member.

16. The cloth measuring device according to claim 15 and wherein said cloth measuring means includes a meter and a cloth engaging meter wheel.

17. The cloth measuring device according to claim 16 and wherein said guide rod includes a short freely rotatable sleeve which is engaged by said meter wheel and between which wheel and sleeve cloth is passed for measurement thereof.

18. The cloth measuring device according to claim 10 and wherein said first and second drive means include control means for adjusting their speed of rotation relative to each other.

* * * * *